(12) United States Patent
Kim et al.

(10) Patent No.: US 12,502,396 B2
(45) Date of Patent: Dec. 23, 2025

(54) HYDROXYPROGESTERONE CAPROATE COMPOSITIONS AND METHODS OF USE IN PREVENTING PRETERM BIRTH

(71) Applicant: Lipocine Inc., Salt Lake City, UT (US)

(72) Inventors: Kilyoung Kim, Salt Lake City, UT (US); Nachiappan Chidambaram, Salt Lake City, UT (US); Mahesh V. Patel, Salt Lake City, UT (US); Benjamin J. Bruno, Salt Lake City, UT (US); Shadi Mehraban, Salt Lake City, UT (US)

( * ) Notice: Subject to any disclaimer, the term of this patent is extended or adjusted under 35 U.S.C. 154(b) by 424 days.

(21) Appl. No.: 17/512,365

(22) Filed: Oct. 27, 2021

(65) Prior Publication Data

US 2023/0101470 A1   Mar. 30, 2023

Related U.S. Application Data

(60) Provisional application No. 63/106,127, filed on Oct. 27, 2020.

(51) Int. Cl.
| | | |
|---|---|---|
| *A61K 31/573* | (2006.01) | |
| *A61K 9/00* | (2006.01) | |
| *A61P 15/06* | (2006.01) | |

(52) U.S. Cl.
CPC .......... *A61K 31/573* (2013.01); *A61K 9/0053* (2013.01); *A61P 15/06* (2018.01)

(58) Field of Classification Search
CPC ............................. A61K 31/573; A61K 9/0053
See application file for complete search history.

(56) References Cited

U.S. PATENT DOCUMENTS

| | | | |
|---|---|---|---|
| 8,932,993 B1 | 1/2015 | Ward | C12Q 1/6883 |
| 8,951,996 B2 | 2/2015 | Giliyar | A61K 9/4841 |
| 9,358,298 B2 | 6/2016 | Giliyar | A61K 47/44 |
| 9,358,299 B2 | 6/2016 | Giliyar | A61K 47/44 |
| 9,364,547 B2 | 6/2016 | Giliyar | A61K 47/44 |
| 9,399,069 B2 | 7/2016 | Giliyar | A61K 47/44 |
| 9,434,991 B2 | 9/2016 | Ward | C12Q 1/6883 |
| 9,840,738 B2 | 12/2017 | Ward | C12Q 1/6883 |
| 10,022,384 B2 | 7/2018 | Giliyar | A61K 31/57 |
| 10,392,665 B2 | 8/2019 | Boniface | C12Q 1/6883 |
| 10,556,922 B2 | 2/2020 | Mirmehrabi | C12Q 1/6883 |
| 10,709,716 B2 | 7/2020 | Giliyar | A61K 31/57 |
| 10,961,584 B2 | 3/2021 | Boniface | C12Q 1/6883 |
| 2011/0152840 A1* | 6/2011 | Lee | A61P 5/30 604/522 |
| 2013/0029957 A1 | 1/2013 | Giliyar | 514/177 |
| 2014/0271882 A1 | 9/2014 | Giliyar | A61K 31/57 |
| 2014/0377317 A1 | 12/2014 | Giliyar | A61K 8/63 |
| 2015/0133382 A1 | 5/2015 | Ward | C12Q 1/6883 |
| 2015/0165049 A1 | 6/2015 | Giliyar | A61K 47/44 |
| 2015/0320768 A1 | 11/2015 | Giliyar | A61K 31/57 |
| 2015/0368714 A1 | 12/2015 | Ward | C12Q 1/6883 |
| 2016/0213686 A1 | 7/2016 | Giliyar | A61K 31/57 |
| 2016/0367568 A1 | 12/2016 | Ward | A61K 31/566 |
| 2017/0007623 A1 | 1/2017 | Giliyar | A61K 31/57 |
| 2017/0035781 A1 | 2/2017 | Giliyar | A61K 31/57 |
| 2018/0245156 A1 | 8/2018 | Ward | C12Q 1/6883 |
| 2018/0282366 A1 | 10/2018 | Mirmehrabi | C07J 7/0045 |
| 2018/0289724 A1 | 10/2018 | Giliyar | A61K 31/57 |
| 2019/0275060 A1 | 9/2019 | Giliyar | A61K 31/57 |
| 2019/0307775 A1 | 10/2019 | Giliyar | A61K 31/57 |
| 2020/0332360 A1 | 10/2020 | Ahn | C12Q 1/6876 |

FOREIGN PATENT DOCUMENTS

| | | | | |
|---|---|---|---|---|
| WO | WO-2016205723 A2 * | 12/2016 | | C07K 14/47 |
| WO | WO2021112842 | 6/2021 | | G01N 33/483 |

OTHER PUBLICATIONS

Shaik et al., Xenobiotica, 2016; 46(2): 169-174 (Year: 2016).*

* cited by examiner

*Primary Examiner* — San Ming R Hui
(74) *Attorney, Agent, or Firm* — Michael R. Schramm

(57) ABSTRACT

An HPC composition and method of treatment for the prevention of PTB and improved neonatal outcomes. The invention provides for a dosing regimen beginning as early as 14 weeks of fetal gestation and dosing regimens of a duration of as much as 25 weeks. The invention provides a high level of exogenous progestin to endogenous progesterone when it is most needed. The instant invention consistently achieves active levels of HPC which achieve effectiveness. Exemplary dosing regimens comprise an oral administration of HPC in the range of 1,200 mg to 1600 mg, wherein the HPC is administered via a once a day, twice a day, or three times a day administration.

36 Claims, No Drawings

HYDROXYPROGESTERONE CAPROATE COMPOSITIONS AND METHODS OF USE IN PREVENTING PRETERM BIRTH

CROSS REFERENCE TO RELATED APPLICATIONS

This nonprovisional utility patent application claims the benefit under 35 U.S.C. § 119(e) of U.S. provisional application No. 61/106,127, filed Oct. 27, 2020, which is incorporated, in its entirety, by this reference.

FIELD OF THE INVENTION

The present invention relates to hydroxyprogesterone caproate (HPC) compositions (including 17-hydroxyprogesterone ester containing compositions) (see for instance: https://en.wikipedia.org/wiki/Hydroxyprogesteron- e_caproate) and may be provided in oral and other dosage forms. The invention further relates to associated methods of administration of HPC, and more especially methods of administration resulting in the prevention of preterm birth (PTB). Accordingly, this invention involves the fields of chemistry, pharmaceutical sciences, medicine and other health sciences.

BACKGROUND OF THE INVENTION

HPC comprising compositions and methods of administration thereof, especially in the prevention of PTB are known in the art. An exemplary injectable composition is known by the tradename MAKENA and is provided by AMAG Pharmaceuticals, Inc. (see: https://makena.com/ !gclsrc=aw.ds). The FDA approved label for MAKENA is incorporated herein by reference and can be found at the following website: https://www.accessdata.fda.gov/drugsatfda_docs/label/2018/021945s0121bl.pdf.

To date, only injectable forms of HPC comprising compositions and method of delivery have been approved in United States for prevention of recurrent PTB. An effective oral enabling method and composition for treatment remains an unmet need to overcome current limitations of an injectable HPC treatment form. Injectable form failed to show effectiveness in a definitive study as required by US FDA. If approved, effective oral method and compositions are expected to be a preferred form by patients and healthcare providers.

Further improved HPC compositions and methods of administration are also known in the art. Such improved HIPC compositions and methods of administration are disclosed in the following list of US patents and applications, all entitled "17-Hydroxyprogesterone Ester-Containing Oral Compositions and Related Methods", and all of which are expressly incorporated herein in their entirety by this reference: U.S. Pat. No. 8,951,996 filed Jul. 28, 2011 and issued Feb. 10, 2015, U.S. Pat. No. 9,358,298 filed Sep. 4, 2014 and issued Jun. 7, 2016, U.S. Pat. No. 9,358,299 filed Jul. 16, 2015 and issued Jun. 7, 2016, U.S. Pat. No. 9,364,547 filed Apr. 24, 2014 and issued Jun. 14, 2016, U.S. Pat. No. 9,399,069 filed Feb. 27, 2015 and issued Jul. 26, 2016, U.S. Pat. No. 10,022,384 filed Apr. 5, 2016 and issued Jul. 17, 2018, U.S. Pat. No. 10,709,716 filed Mar. 28, 2019 and issued Jul. 14, 2020, 2013/0029957 filed Jul. 28, 2011 and published Jan. 31, 2013, 2014/0271882 filed Apr. 24, 2014 and published Sep. 18, 2014, 0377317 filed Sep. 4, 2014 and published Dec. 25, 2014, 2015/0165049 filed Feb. 27, 2015 and published Jun. 18, 2015, 2014, 2015/0320768 filed Jul. 16, 2015 and published Nov. 12, 2015, 2016/0213686 filed Apr. 5, 2016 and published Jul. 28, 2016, 2017/0007623 filed Sep. 15, 2016 and published Jan. 12, 2017, 2017/0035781 filed Jun. 22, 2016 and published Feb. 9, 2017, 2018/0289724 filed Jun. 15, 2018 and published Oct. 11, 2018, 2019/027506 filed Aug. 6, 2018 and published Sep. 12, 2019, and 20190307775 filed Mar. 28, 2019 and published Oct. 10, 2019.

Additionally, methods and markers associated with detecting a predisposition to PTB are known in the art. Such methods and markers are disclosed in the following list of US patents and applications, U.S. Pat. No. 8,932,993 for "Method of Testing for Endometriosis and Treatment Therefor" filed Mar. 7, 2013 and issued Jan. 13, 2015, U.S. Pat. No. 9,434,991 for "Method of Testing for Endometriosis and Treatment Therefor" filed Mar. 7, 2013 and issued Sep. 6, 2016, U.S. Pat. No. 9,840,738 for "Method of Testing for Endometriosis and Treatment Therefor" filed Jan. 12, 2015 and issued Dec. 12, 2017, U.S. Pat. No. 10,392,665 for "Biomarker Pairs for Predicting Preterm Birth" filed Jun. 17, 2016 and issued Aug. 27, 2019, U.S. Pat. No. 10,961,584 for "Biomarker Pairs for Predicting Preterm Birth" filed Apr. 10, 2019 and issued Mar. 30, 2021, 20150133382 for "Method of Testing for Endometriosis and Treatment Therefor" filed Jan. 12, 2015 and published May 14, 2015, 20150368714 for "Method of Testing for Endometriosis and Treatment Therefor" filed Mar. 7, 2013 and published Dec. 24, 2015, 20160367568 for "Method of Testing for Endometriosis and Treatment Therefor" filed Sep 5, 2016 and published Dec 22, 2016, 20180245156 for "Method of Testing for Endometriosis and Treatment Therefor" filed Dec. 11, 2017 and published Aug. 30, 2018, and 20200332360 for "Method and Kit for diagnosing Preterm Birth" filed Apr. 16, 2020 and published Oct. 22, 2020, all of which are expressly incorporated herein in their entirety by this reference.

SUMMARY OF THE INVENTION

The present invention is an HPC composition and method of treatment for the prevention of recurrent PTB (e.g. birth at less than 32, 35, or 37 weeks gestation) and improved neonatal outcomes (e.g. an improved Neonatal Composite Index (NCI)). The invention provides for a dosing regimen beginning as early as 14 weeks of fetal gestation and provides for dosing regimens of a duration of as much as 25 weeks. The invention provides a high level of exogeneous progestin to endogenous progesterone when it is most needed. The instant invention provides for compositions and methods that consistently achieve therapeutically effective levels of HPC. Exemplary dosing regimens comprise an oral administration of HPC in the range of 1,200 mg to 1600 mg, wherein the HPC is administered via a once a day, twice a day, or three times a day administration. The method may further include administering the HPC composition to a subject that is known to be at altered risk of PTB due to the subject having at list one PTB risk factor which may include a genetic marker associated with an altered risk of PTB.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Before the present HPC composition and methods of treatment for the prevention of PTB are disclosed and described, it is to be understood that this invention is not limited to the particular process steps and materials disclosed herein, but is extended to equivalents thereof, as would be recognized by those ordinarily skilled in the relevant arts. It should also be understood that terminology employed herein is used for the purpose of describing particular embodiments only and is not intended to be limiting.

It should be noted that, the singular forms "a," "an", and "the" include plural referents unless the context clearly dictates otherwise. Thus, for example, reference to "an excipient" includes reference to one or more of such excipients, and reference to "the carrier" includes reference to one or more of such carriers.

Definitions

As used herein, the term "fetus" refers to an unborn human offspring (baby) and in particular to an unborn human baby having an age of more than eight weeks post conception. As used herein, the term "neonate" in once instance refers to a newborn infant or child under 4 weeks of age, and in another instance refers to a newborn infant or child under 10 weeks of age. As used herein, the term "miscarriage" refers to the expulsion of a fetus from the womb before it is able to survive independently, especially spontaneously or as the result of accident.

As used herein, the term "qualified PTB" or "qualifying delivery" refers to a singleton PTB, whether spontaneous or indicated, wherein the Gestational Age (GA) of the fetus at birth was at least 20 weeks but less than at least one of 28 weeks, 29 weeks, 30 weeks, 31 weeks, 32 weeks, 33 weeks, 34 weeks, 35 weeks, 36 weeks, and 37 weeks. The term "qualified PTB" or "qualifying delivery" has application to criteria of identifying a patient at risk of PTB based on a history of a previous PTB(s).

As used herein, the term "treatment", when used in conjunction with the administration of pharmaceutical compositions and oral dosage units containing HPC, refers to the administration of the oral dosage units and pharmaceutically acceptable composition to subjects who are either asymptomatic or symptomatic. In other words, "treatment" can both be to reduce or eliminate symptoms associated with a condition present in a subject, or it can be prophylactic treatment, i.e. to prevent the occurrence (or reoccurrence) of the symptoms in a subject. Such prophylactic treatment can also be referred to as prevention of the condition.

As used herein, the terms "formulation" and "composition" are used interchangeably and refer to a mixture of two or more compounds, elements, or molecules. In some aspects the terms "formulation" and "composition" may be used to refer to a mixture of one or more active agents with a carrier or other excipients. Furthermore, the term "dosage form" can include one or more formulation(s) or composition(s) provided in a format for administration to a subject. When any of the above terms is modified by the term "oral" such terms refer to compositions, formulations, or dosage forms formulated and intended for oral administration to subjects.

As used herein, the term "fatty acid" refers to unionized carboxylic acids with a long aliphatic tail (chain), either saturated or unsaturated, conjugated or non-conjugated.

Unless otherwise specified, the term C8 to C22 fatty acid glycerides refers to a mixture of mono-, di-, and/or triglycerol esters of medium to long chain (C8 to C22) fatty acids.

Further, as used herein, the dispersant of the current invention is at least one selected from the group of hydrophilic surfactant or lipophilic surfactant. In one embodiment, the dispersant includes a hydrophilic surfactant.

As used herein, the term "solidifying agent" or "solidifying additive" are used interchangeably and refer to a pharmaceutically acceptable additive that is in a solid physical state at 20° C. Similarly, a "solid lipophilic additive" refers to a lipophilic compound or component that is in a solid physical state at 20° C. and/or renders the composition or dosage form non-liquid, such as solid or semi-solid.

As used herein, the term "lipophilic," refers to compounds that are not freely soluble in water; and the term "lipophilic surfactant" refers to surfactants that have HLB (hydrophilic-lipophilic balance) values of about 10 or less. Conversely, the term "hydrophilic" refers to compounds that are soluble in water; and term "hydrophilic surfactant" refers to surfactants that have HLB values of more than about 10.

As used herein, the term "ionizable fatty acid" refers to a fatty acid compound that changes its HLB as a function of pH. For example oleic acid is predominantly lipophilic at lower pH values (such as those found in the stomach) but becomes a predominantly hydrophilic at higher pH values (such as those found in the intestine).

As used herein, "subject" refers to a mammal that may benefit from the administration of a drug composition or method of this invention. Examples of subjects include humans. In one aspect, the subject can be a human female who has previously given birth preterm.

As used herein, a "responder" is a subject who responds to an exogenous oral HPC therapy. "Responder analysis" is the assessment of the effectiveness of HPC therapy in a group of subjects deemed to obtain benefits of oral HPC therapy.

As used herein, "group" or "group of subjects" refers to a collection of at least 24 human female subjects who receive and respond to exogenous oral administration of the compositions disclosed herein, namely HPC containing compositions. In one aspect, the group can include at least 25 or at least 100 or at least 300 female subjects. In another aspect, the group can include at least 1,000 female subjects.

The term "oral administration" represents any method of administration in which an active agent can be administered by swallowing, chewing, or sucking of the dosage form. The composition of the current inventions can be admixed with food or drink prior to being orally consumed.

As used herein, "regimen" refers to an administration scheme comprising at least one dosage. As used herein, "dosage" refers to the prescribed administration of a specific amount, number, and frequency of doses over a specific period of time (ref: https://www.verywellhealth.com/drug-dose-definition-and-examples-1123989). As used herein, "dose" refers to a single instance of a quantity of a composition (e.g. medicine or drug) taken or recommended to be taken at a particular time. For example, a regimen having an initial dosage for a female subject may provide for a predetermined amount of HPC administered within 30 min post meal (e.g. breakfast) having about 15-55 g of fat content repeated daily.

As used herein, a dose refers to a specified amount of medication taken at one time. By contrast, the dosage is the prescribed administration of a specific amount, number, and frequency of doses over a specific period of time. Also, as used herein, "daily dose" refers to the amount of active agent (e.g. HPC) administered to a subject over a 24 hour period of time. The daily dose in a dosage can be administered via one or more administrations during the 24 hour period. In one embodiment, the daily dose provides for one administration in a 24 hour period.

As used herein, "steady state" refers to a state of stable response in serum total HPC levels to exogenously HPC, typically achieved after at least 7 days following the start of a dosing regimen.

As used herein, an "effective amount" or a "therapeutically effective amount" of a drug refers to a non-toxic, but sufficient amount of the drug, to achieve therapeutic results in treating a condition for which the drug is known to be effective. It is understood that various biological factors may affect the ability of a substance to perform its intended task. Therefore, an "effective amount" or a "therapeutically effective amount" may be dependent in some instances on such biological factors. Further, while the achievement of therapeutic effects may be measured by a physician or other qualified medical personnel using evaluations known in the art, it is recognized that individual variation and response to treatments may make the achievement of therapeutic effects a somewhat subjective decision. The determination of an effective amount is well within the ordinary skill in the art of pharmaceutical sciences and medicine. See, for example, Meiner and Tonascia, "Clinical Trials: Design, Conduct, and Analysis," *Monographs in Epidemiology and Biostatistics*, Vol. 8 (1986), incorporated herein by reference.

The terms "plasma HPC concentration", "HPC concentration in the blood", "total HPC concentration", "HPC concentration", "HPC level", and "serum HPC concentration" are used interchangeably and refer to the "total" HPC concentration which is the sum of the bioavailable HPC including free and protein-bound HPC concentrations. As with any bio-analytical measure, for increased consistency the method employed to measure initial serum HPC levels should be consistent with the method used to monitor and re-measure serum HPC levels during clinical testing and HPC therapy for a subject. Unless otherwise stated, "HPC concentration" refers to serum total HPC concentration (level).

As used herein, the average total HPC concentration can be determined using methods and practices known in the art. For example, the average baseline blood HPC concentration of a human female is the arithmetic mean of the total blood (serum or plasma) HPC concentrations determined on at least two consecutive time points that are reasonably spaced from each other, for example from about 1 hour to about 168 hours apart. In a particular case, the blood HPC concentration can be determined on at least two consecutive times that are about 24 hours to about 48 hours apart. In another particular method, the blood HPC concentration of the human male can be determined at a time between about 5 o'clock and about 11 o'clock in the morning. Further, the blood HPC concentration can be the determined by standard analytical procedures and methods available in the art, such as for example, automated or manual immunoassay methods, liquid chromatography or liquid chromatography—tandem mass spectrometry (LC-MS/MS) etc.

As used herein, the term $AUC_{0-t}$ is the area under the curve of a plasma-versus-timegraph determined for the analyte from the time 0 to time "t".

As used herein, the term "$C_{max}$" refers to a maximum serum concentration level post single dose administration or maximum serum concentration during a 24 hr period post total daily dose administration, "$C_{min}$" refers to a minimum serum concentration level post single dose administration or minimum serum concentration during a 24 hr period post total daily dose administration, and "$C_{pre-dose}$" refers to a nominal steady state serum concentration level prior to any dose administration. As used herein, the term "$C_{avg}$", "$C_{ave}$", or "$C_{average}$" are used interchangeably and is determined as the AUC divided by the time period (t). For example, $C_{avg-8h}$ is the average plasma concentration over a period of 8 hours post-dosing determined by dividing the $AUC_{0-8}$ value by 8. Similarly, $C_{avg-12h}$ is the average plasma concentration over a period of 12 hours post-dosing determined by dividing the $AUC_{0-12}$ value by 12; $C_{avg-24h}$ is the average plasma concentration over a period of 24 hours post-dosing determined by dividing the $AUC_{0-24}$ value by 24, and so on. Unless otherwise stated, all $C_{avg}$ values are considered to be $C_{avg-24h}$.

As used herein, "$C_t$" refers to the serum concentration of HPC at time "t" after administration of a single dose of the drug. The time "t" is generally in hours, unless otherwise specified. For example, a $C_t$ of "$C_{(-2\ to\ 0)}$" refers to serum HPC concentration measured in a sample collected between the time of about 2 hours before and just immediately prior to dosage administration to a subject. Similarly, $C_t$ of "$C_{(2\ to\ 4)}$" refers to serum HPC concentration measured in a sample collected between the time of about 2 hours and 4 hours after administration of a dosage to a subject. For another instance, "$C_5$" refers to serum HPC concentration measured in a sample collected at about 5 hours after administration of a dose to a subject.

As used herein, the term "about" is used to provide flexibility to a numerical range endpoint by providing that a given value may be "a little above" or "a little below" the endpoint. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, levels and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges or decimal units encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range, or the characteristics being described.

Invention

Reference will now be made in detail to preferred embodiments of the invention. While the invention will be described in conjunction with the preferred embodiments, it will be understood that it is not intended to limit the invention to those preferred embodiments. To the contrary, it is intended to cover alternatives, variants, modifications, and equivalents as may be included within the spirit and scope of the invention as defined by the appended claims.

An embodiment of the invention is an HPC composition and method of treatment for the prevention of PTB (e.g. birth at less than 32, 35, or 37 weeks gestation) and improved neonatal outcomes—e.g. an improved Neonatal Composite Index (NCI) (see efficacy endpoints). See also NCI as used in the BRUDAC meeting of Oct. 29, 2019 by both Makena and the FDA, the briefings of which are incorporated by reference herein and can be found at: https://www.fda.gov/media/132004/download and https://www.fda.gov/media/132003/download).

In an embodiment, an HPC method in this invention is for treating a pregnant subject who had a qualified PTB or qualifying delivery. In one aspect, the invention comprises treating a pregnant subject who had a qualifying PTB with less than <35 weeks of GA. In another aspect, the current HPC method in this invention comprises treating a pregnant subject who had a qualifying PTB with less than <32 weeks of GA. In a further aspect, the current HPC method in this invention comprises treating a pregnant subject who had a qualifying PTB with less than <28 weeks of GA.

In various embodiments of the invention, more than 15%, 20%, 30%, 40%, and up to 50% of groups of (pregnant) subjects had a qualified PTB of less than 32 weeks of GA.

In various embodiments of the invention, more than 35%, 40%, 45%, 50%, 67%, 75%, 80%, and 90% of groups of (pregnant) subjects had a qualified PTB between 32 weeks and <35 weeks of GA.

In various embodiments of the invention, more than 35%, 40%, 45%, 50%, 67%, 75%, 80%, and 90% of groups of (pregnant) subjects had an immediately preceding PTB between 32 weeks and <35 weeks of GA.

In various embodiments of the invention, less than 15%, 25%, 33%, and 50% of groups of (pregnant) subjects had a qualified PTB between 35 weeks and 36 weeks +6 days of GA.

In various embodiments of the invention, less than 15%, 25%, 33%, and 50% of groups of (pregnant) subjects had an immediately preceding PTB between 35 weeks and 36 weeks+6 days of GA.

In the prior art, such as an injectable HPC method (e.g. MAKENA), the recommended HPC dosing regimen includes administration of 250 mg HPC per week beginning at 16 weeks to 20 weeks of GA and continuing until the earlier of the $37^{th}$ week (or 36 weeks and 6 days) of GA or delivery for a maximum treatment duration of 21 weeks if treatment starts at 16 weeks of GA resulting in questionable efficacy of therapy. In contrast, by starting treatment earlier than 16 weeks of GA, such as 15 weeks of GA, and even as early as 14 weeks of GA, the instant invention provides a desired level of effectiveness. Moreover, the dosing regimen of instant invention can also provide the desired level of effectiveness by treating through the earlier of the $39^{th}$ week (or 38 weeks and 6 days) of GA or 2 weeks after delivery for a maximum treatment duration of 25 weeks if treatment is started at 14 weeks of GA.

In an embodiment, the instant invention provides for initiating treatment of a pregnant woman at a GA of one of at least 14 weeks, at least 15 weeks, at least 16 weeks, at least 17 weeks, at least 18 weeks, at least 19 weeks, and at least 20 weeks.

In another embodiment, the instant invention provides for a treatment of a pregnant woman for up to one of 39 weeks of GA, 38 weeks of GA, 37 weeks of GA, or 2 weeks after delivery.

In further embodiment, the instant invention provides for a treatment duration of a pregnant woman for a maximum of one of 25 weeks, 24 weeks, 23 weeks, 22 weeks, 21 weeks, 20 weeks, 19 weeks, 18 weeks, and 17 weeks.

In another embodiment, the instant invention provides benefits of prolonging pregnancy in patients at risk of PTB, resulting in improved neonatal mortality and morbidity as a function of GA and reduced neonatal hospital stay.

Typical time to steady state (or targeted effective) HPC levels from weekly injectable HPC administration method is at least multiple weeks, which may contribute to questionable effectiveness of such methods. In contrast, the instant invention results in steady state (or targeted effective) HPC levels between 2 days and 7 days post intervention initiation. Therefore, in one embodiment the instant invention enables steady state or targeted effective levels of HPC for up to 25 weeks for improved therapy effectiveness or at least 4 weeks more than injectable HPC methods.

In an embodiment, the instant invention can achieve steady state HPC levels in less than at least one of 1 week, 6 days, 5 days, 4 days, 3 days, and 2 days post therapy initiation. In an embodiment, the instant invention achieves steady state (e.g. day 7) levels of HPC with a group mean $C_{max}$ (per day) of greater than one of about 30 ng/mL, about 35 ng/mL, about 40 ng/mL, about 45 ng/mL, about 50 ng/mL, about 55 ng/mL, about 60 ng/mL, about 70 ng/mL, about 80 ng/mL, about 90 ng/mL, about 100 ng/mL, about 150 ng/mL, and about 180 ng/mL post single dose.

In an embodiment, the instant invention achieves steady state (e.g. day 7) levels of HPC with a group mean $C_{avg}$ greater than one of about 6 ng/ml, about 12 ng/mL, about 15 ng/mL, about 20 ng/mL, about 25 ng/mL, about 30 ng/mL, about 35 ng/mL, about 40 ng/mL, about 45 ng/ml, and about 50 ng/mL post daily dose administration.

In an embodiment, the instant invention achieves steady state (e.g. day 7) levels of HPC with a group mean $T_{max}$ of one of less than 4 hrs, less than 6 hrs, less than 8 hrs, less than 10 hrs, and less than 12 hrs post single dose administration.

In an embodiment, the instant invention provides an intraday fluctuating pharmacokinetic profile with a ratio of $C_{max}$ to $C_{min}$ levels (intraday fluctuation ratio) post administration of a single dose of the oral HPC composition of one of at least 6, at least 8, at least 10, at least 15, at least 20, at least 25, at least 30, and at least 40.

PTB is a primary cause of neonatal morbidity and mortality. Neonatal mortality risk is about three-fold higher in a PTB at 35-36 weeks and severely increases as PTB GA at delivery decreases. Neonatal morbidities, such as respiratory distress requiring oxygen, temperature instability, hypoglycemia, jaundice, cerebral palsy, developmental delay, etc. are quite common. Several components of neonatal outcomes including neonatal mortality, such as death prior to (hospital) discharge, grade III or IV intraventricular hemorrhage, respiratory distress syndrome, bronchopulmonary dysplasia, necrotizing enterocolitis, and proven sepsis, are used for evaluating clinical efficacy of the intervention for treating pregnant women with risk of recurrent PTB.

In an embodiment, the instant invention improves (reduces the rate of occurrence) at least one or a combination of the individual components of neonatal outcomes of death prior to (hospital) discharge, grade III or IV intraventricular hemorrhage, respiratory distress syndrome, bronchopulmonary dysplasia, necrotizing enterocolitis, and proven sepsis, when therapy for pregnant women having risk of recurrent PTB is initiated by a GA of at least one of 14 weeks, 15 weeks, 16 weeks, 17 weeks, 18 weeks, 19 weeks, and 20 weeks. This is in distinct contrast to the results of prior art methods such as non-HPC treatment or injectable HPC treatment.

In another embodiment, the instant invention improves (reduces the rate of occurrence) at least one or a combination of the individual components of neonatal outcomes such as death prior to (hospital) discharge, grade III or IV intraventricular hemorrhage, respiratory distress syndrome, bronchopulmonary dysplasia, necrotizing enterocolitis, and proven sepsis, when therapy extends for up to 39 weeks or 2 weeks post-delivery for pregnant women having risk of recurrent PTB. This is in distinct contrast to the results of prior art methods such as non-HPC treatment or injectable HPC treatment.

In a further embodiment, the instant invention improves (reduces the rate of occurrence) at least one or a combination of the individual components of neonatal outcomes including death prior to (hospital) discharge, grade III or IV intraventricular hemorrhage, respiratory distress syndrome, bronchopulmonary dysplasia, necrotizing enterocolitis, and proven sepsis, when therapy duration is maintained up to 18 weeks, 19 weeks, 20 weeks, 21 weeks, 22 weeks, 23 weeks, 24 weeks, and 25 weeks for pregnant women having risk of recurrent PTB. This is in distinct contrast to the results of prior art methods such as non-HPC treatment or injectable HPC treatment.

In one embodiment, compared to prior art methods (i.e. non-HPC treatment or injectable HPC treatment), the instant invention improves (reduces the rate of occurrence) neonatal outcomes by improving at least one component of neonatal morbidity and mortality (i.e. NCI) of death prior to (hospital) discharge, grade III or IV intraventricular hemorrhage, respiratory distress syndrome, bronchopulmonary dysplasia, necrotizing enterocolitis, and proven sepsis by one of at least 5%, at least 6%, at least 7%, at least 8%, at least 9%, and at least 10% when therapy is initiated (on pregnant women having risk of recurrent PTB) at no later than a GA of at least one of 14 weeks, 15 weeks, 16 weeks, 17 weeks, 18 weeks, 19 weeks, and 20 weeks.

In another embodiment, the instant invention improves (reduces the rate of occurrence) at least one or a combination of typical neonatal morbidities, such as respiratory distress syndrome, respiratory distress requiring oxygen, all grade intraventricular hemorrhage, retinopathy leukomalacia, temperature instability, hypoglycemia, jaundice, cerebral palsy, developmental delay, persistent pulmonary hypertension, seizures, hypoxic-ischemic encephalopathy, necrotizing enterocolitis, bronchopulmonary dysplasia, RD S, hyperbilirubinemia requiring treatment, and hypotension requiring treatment, when the therapy is initiated (on pregnant women having risk of recurrent PTB) at a GA of no later than at least one of 14 weeks, 15 weeks, 16 weeks, 17 weeks, 18 weeks, 19 weeks, and 20 weeks.

Risk for PTB in pregnant women may be increased due to any or a combination of factors such as: a history of spontaneous PTB (past obstetrics history), a history of a number of PTBs, a history of a GA of previous PTB of less than at least one of 37 weeks, 35 weeks, and 32 weeks, a history of immediately preceding spontaneous PTB (past obstetrics history), a cervical insufficiency, a cervical length of <2.5 cm at mid pregnancy, a presence of fetal fibronectin in vaginal secretions; a low maternal Body Mass Index (BMI), a predetermined maternal race (e.g. African American); a maternal age of <17 and >35 years, and a smoking history. The instant invention is particularly suited for subjects with PTB altered risk with cervical insufficiency.

Dosage Form

In an aspect, compositions of the instant invention may be provided as solid dosage forms such as tablets, caplets, granules, beads, particulates, etc., or as a liquid solution form in a dosage unit. This provides multiple options of manufacturing the compositions allowing manufacturers to employ diverse manufacturing techniques. All the oral dosage forms of the present invention may provide the drug in the form of a solution, a suspension, a particulate, etc., all of which may be produced by conventional methods of processing and manufacture known in the art.

In another aspect, compositions of the instant invention may be formulated to include a therapeutically effective amount of HPC and a pharmaceutically acceptable carrier. In one embodiment, a composition of the instant invention may provide therapeutically effective levels of HPC for the prevention of recurrent PTB and/or improvement of neonatal outcomes.

The prior art—MAKENA—has been approved for an intramuscular (IM) and subcutaneous injectable dosing regimen of 250 and 275 mg per week, respectively, but may have resulted in compromised effectiveness in a significant proportion of subjects at risk of recurrent PTB (20-25%) due to inadequate active levels of HPC to achieve effectiveness. Whereas the instant invention consistently achieves effective levels of HPC. In an embodiment of the instant invention, dosing regimens comprise an oral administration of HPC in the range of 1,200 mg to 1600 mg, wherein the HPC is administered via a once a day, twice a day, or three times a day administration.

In an embodiment, the instant invention provides for administering a dosing regimen of HPC to a subject having one or more risk factors including a subject having had a qualifying PTB of less than 35 weeks GA, a subject having had a qualifying PTB of less than 32 weeks GA, a subject having abused a substance during pregnancy, a subject being unmarried and partnerless, a subject having an educational level of no more than 12 years, a subject being of a predetermined age, a subject being of a predetermined race, a subject's fetus being of a predetermined gender (e.g. male), and any other risk factors (Manuck Risk Factor ((MRF) (see: "Racial and Ethnic Differences in Preterm Birth" which is incorporated herein by reference and can be found at: https://www.ncbi.nlm.nih.gov/pmc/articles/PMC6381592/). In an aspect, dosing regimens of the instant invention comprise an oral administration of HPC in the range of 1,200 mg to 1600 mg, wherein the HPC is administered via a once a day, twice a day, or three times a day administration.

In an embodiment, dosing regimens of the instant invention comprise an oral administration of HPC in the range of 1,200 mg to 1600 mg, wherein the HPC is administered via a once a day, twice a day, or three times a day wherein the administration initiation ranges from 14 weeks (14 weeks and 0 days) GA up to 20 weeks (20 weeks and 6 days) GA.

In another embodiment, dosing regimens of the instant invention comprise an oral administration of HPC in the range of 1,200 mg to 1600 mg, wherein the HPC is administered once a day, twice a day, or three times a day, of which the regimen extends up to 39 weeks (38 weeks and 6 days) GA or 2 weeks post-delivery.

In another embodiment, dosing regimens of the instant invention comprise an oral administration of HPC in the range of 1,200 mg to 1600 mg, wherein the HPC is administered once a day, twice a day, or three times a day, of which the regimen duration is maintained for up to 25 weeks (start of therapy: 14 weeks to 20 weeks, and end of therapy: up to 39 weeks or 2 weeks post-delivery).

In one aspect, compositions of the instant invention comprise at least one of a crystalline and a non-crystalline form of HPC.

The therapeutically effective amount of HPC can be formulated with a pharmaceutically acceptable carrier to deliver sufficient (effective) levels of HPC to prevent recurrent PTB and/or improve neonatal outcomes when administered to a pregnant woman who has had a qualifying PTB. In some embodiments, such a carrier can include an additive. A wide variety of additives can be used to formulate with HPC in the current oral HPC pharmaceutical composition in order to provide therapeutically effective levels of HPC for treating a pregnant woman for the prevention of recurrent PTB and/or improvement of neonatal outcomes.

Examples of suitable additives to create a non-crystalline or partially crystalline form of HPC in a dosage form can include: (i) tocopherol (e.g. vitamin E) or its derivatives; (ii) fatty acids or their salts; (iii) glyceryl fatty acid esters; (iv) PEG glycerides of fatty acid esters; (v) polyglycerol fatty acid esters; (vi) triglycerides; (vii) hydrogenated polyoxyl vegetable oils or glycerides; (viii) propylene glycol fatty acid esters; (ix) edible oils; (x) sterols or its derivatives, (xi) omega oils, such as omega fatty acids, fish oil, flax seed oil, algae oil, and the like, or combinations thereof.

In one aspect, (i) tocopherol or its derivatives can comprise: alpha-tocopherol, beta-tocopherol, gamma-tocopherol, delta-tocopherol, tocopherol acetate, tocopherol linoleate, tocopherol succinate, tocotrienols (alpha-, beta-, gamma-, or delta-), tocofersolan or TPGS (PEG derivatives of alpha-tocopherol), the like, or combinations thereof.

In another aspect, (ii) fatty acids or their salts can comprise: octanoic acid, capric acid, lauric acid, myristic acid, palmitic acid, stearic acid, oleic acid, linoleic acid, linoelaidic acid, sodium caproate, sodium caprylate, sodium laurate, sodium myristate, sodium palmitate, sodium oleate, sodium stearate, SLS, sodium lauryl sarcosinate, sodium dioctyl sulfosuccinate, sodium cholate, sodium taurocholate, the like, or combinations thereof.

In another aspect, (iii) glyceryl fatty acid esters can comprise: glyceryl monooleate, glyceryl monoleate/linoleate, glyceryl monolinoleate, glyceryl ricinoloeate, glyceryl monolaurate, glyceryl monopalmitate, glyceryl monostearate, glyceryl mono-/di-oleate, glyceryl palmitate/stearate, glyceryl acetate, glyceryl laurate, glyceryl citrate/lactate/oleate/linoleate, glyceryl caprylate, glyceryl caprylate/caprate, glyceryl dicaprylate/dicaprate, mono-/di-acetylated monoglycerides, glyceryl monostearate, glyceryl dilaurate, glyceryl dioleate, the like, or combinations thereof.

In yet another aspect, (iv) PEG glycerides of fatty acid esters can comprise: PEG fatty acid monoesters, PEG glycerol fatty acid esters, PEG fatty acid diesters, PEG fatty acid mono-/di-ester mixtures, PEG triglycerides of fatty acid esters, the like, or combinations thereof. PEG glycerol fatty acid esters can comprise: PEG glyceryl laurate, PEG glyceryl laurate, PEG glyceryl caprylate, PEG glyceryl caprate, PEG glyceryl oleate, PEG glyceryl mono-/di-fatty acid ester mixtures, the like, or combinations thereof. PEG fatty acid monoesters can comprise: esters of caprylic acid, capric acid, lauric acid, oleic acid, and stearic acid, the like, or combinations thereof. Examples of the PEG fatty acid monoesters can include PEG (1-100, 200, 300, 400) monocaprylate, PEG (1-100, 200, 300, 400) monocaprate, PEG (1-100, 200, 300, 400) monolaurate, PEG (1-100, 200, 300, 400) monooleate, PEG (1-100, 200, 300, 400) monopalmitate, PEG (1-100, 200, 300, 400) monostearate, and PEG (1-100, 200, 300, 400) monococoate, the like, or combinations thereof. PEG fatty acid diesters can comprise PEG (4-32) dicaprylate, PEG (4-32) dicaprate, PEG (4-32) dilaurate, PEG (4-32) dioleate, PEG (4-32) distearate, and PEG (4-32) dipalmitate, the like, or combinations thereof. PEG fatty acid mono-/di-ester mixtures can comprise: PEG caprylate/caprate, PEG mono-/di-caprylate, PEG mono-/di-caprate, PEG mono-/di-laurate, PEG mono-/di-oleate, and PEG mono-/di-stearate the like, or combinations thereof. PEG triglycerides of fatty acid esters can comprise: lauroyl polyoxylglycerides, stearoyl polyoxylglycerides, oleoyl polyoxyl glycerides, linoleoyl polyoxyl glycerides, lauroyl polyoxyl glycerides, caprylocaproyl polyoxyl glycerides, and behenoyl polyoxylglycerides the like, or combinations thereof.

In a further aspect, (v) polyglycerol fatty acid esters can comprise: polyglyceryl (2, 3, 4, 6, 10) oleate, polyglyceryl (2, 3, 4, 6, 10) dioleate, polyglyceryl (2, 3, 4, 6, 10) trioleate, polyglyceryl (2, 3, 4, 6, 10) laurate, polyglyceryl (2, 3, 4, 6, 10) dilaurate, polyglyceryl (2, 3, 4, 6, 10) trilaurate, polyglyceryl (2, 3, 4, 6, 10) stearate, polyglyceryl (2, 3, 4, 6, 10) distearate, polyglyceryl (2, 3, 4, 6, 10) tristearate, polyglyceryl (2, 3, 4, 6, 10) mono-/di-oleate, polyglyceryl (3,6,10) caprate, polyglyceryl (3,6,10) dicaprate, polyglyceryl (3,6,10) tricaprate, polyglyceryl (3,6,10) caprylate, polyglyceryl (3,6,10) dicaprylate, polyglyceryl (3,6,10) tricaprylate, polyglyceryl (3,6,10) polystearate, polyglyceryl (3,6,10) polyoleate, polyglyceryl (3,6,10) mono-/di-oleate, polyglyceryl (3,6,10) caprylate, polyglyceryl (3,6,10) polycaprylate, polyglyceryl (3,6,10) caprate, polyglyceryl (3,6, 10) polycaprate, and polyglyceryl (3,6,10) caprylate/caprate, the like, or combinations thereof.

In another aspect, (vi) triglycerides can comprise: glyceryl tricaprylate, glyceryl tricaprate, glyceryl tricaprylate/tricaprate, glyceryl tricaprylate/tricaprate/tri succinate, glyceryl trioleate, glyceryl tristearate, glyceryl trilaurate, medium chain natural oils, the like, or combinations thereof.

In yet another aspect, (vii) hydrogenated polyoxyl vegetable oils or glycerides can comprise: castor oil or hydrogenated castor oil, or an edible vegetable oil such as corn oil, olive oil, peanut oil, palm kernel oil, apricot kernel oil, peppermint oil, coconut oil, sunflower seed oil, or almond oil, the like, or combinations thereof. The polyoxyl group can include glycerol, propylene glycol, ethylene glycol, polyethylene glycol, sorbitol, pentaerythritol, the like, or combinations thereof. Examples of hydrogenated polyoxyl vegetable oils or glycerides can comprise: PEG-35 castor oil (Incrocas-35, KOLLIPHOR EL, CREMOPHOR EL), PEG-40 hydrogenated castor oil (KOLLIPHOR RH 40, CREMOPHOR RH40), PEG-25 trioleate (tagatrto), PEG-60 corn glycerides (CROVOL M70), PEG-60 almond oil (CROVOL A70), PEG-40 palm kernel oil (CROVOL PK70), PEG-50 castor oil (Emalex C-50), PEG-50 hydrogenated castor oil (Emalex HC-50), PEG-8 caprylic/capric glycerides (LABRASOL), PEG-6 caprylic/capric glycerides (SOFTIGEN 767), PEG-5 hydrogenated castor oil, PEG-7 hydrogenated castor oil, PEG-9 hydrogenated castor oil, PEG-6 corn oil (LABRAFIL M. 2125 CS), PEG-6 almond oil (LABRAFIL M 1966 CS), PEG-6 apricot kernel oil (LABRAFIL M 1944CS), PEG-6 olive oil (LABRAFIL M 1980 CS), PEG-6 peanut oil (LABRAFIL M 1969 CS), PEG-6 hydrogenated palm kernel oil (LABRAFIL M2130 BS), PEG-6 palm kernel oil (LABRAFIL M 2130 CS), PEG-6 triolein (LABRAFIL M 2735 CS), PEG-8 corn oil (LABRAFIL WL 2609 BS), PEG-20 corn glycerides (CROVOL M40), and PEG-20 almond glycerides (CROVOL A40), the like, or combinations thereof.

In one aspect, (viii) propylene glycol fatty acid esters can comprise: propylene glycol monolaurate (LAUROGLYCOL FCC), propylene glycol ricinoleate (PROPYMULS), propylene glycol monooleate (MYVEROL P-O6), propylene glycol dicaprylate/dicaprate (CAPTEX 200), and propylene glycol dioctanoate (CAPTEX 800), propylene glycol monocaprylate (CAPRYOL 90, NIKKOL Sefsol 218), propylene glycol myristate, propylene glycol monostearate, propylene glycol ricinolate, propylene glycol isostearate, propylene glycol caprylate/caprate, propylene glycol dioleate, propylene glycol distearate, propylene glycol dilaurate, propylene glycol dicaprylate, and propylene glycol dicaprate, the like, or combinations thereof.

In another aspect, (ix) edible oils can comprise: corn oil, olive oil, peanut oil, coconut oil, peppermint oil, sunflower seed oil, castor oil, safflower oil, borage oil, cottonseed oil, soybean oil, palm kernel oil, apricot kernel oil, almond oil, omega-3 oil or its derivatives, the like, or combinations thereof.

In one aspect, (x) sterols or its derivatives can comprise: cholesterol, sitosterol, lanosterol, phytosterol, its PEG derivatives, the like, or combinations thereof.

In one embodiment, an additive can be a substance that can be added to the pharmaceutical formulation to enhance the solubilization, separation, or dispersion of the particles, or to enhance the dissolution and further absorption of the particles into the body. Examples of additives can include a lipophilic additive when it has an HLB value of 10 or less, or a hydrophilic additive when it has an HLB value of greater than 10.

In one aspect, the pharmaceutically acceptable carrier can comprise a hydrophilic additive, a lipophilic additive, or a combination thereof.

In one aspect, lipophilic additives can comprise, but are not limited to: mono-, di-glycerides of fatty acids, reaction mixtures of alcohols or polyalcohols with a variety of natural and/or hydrogenated oils such as PEG-5 hydrogenated castor oil, PEG-7 hydrogenated castor oil, PEG-9 hydrogenated castor oil, PEG-6 corn oil (e.g. LABRAFIL M 2125 CS), PEG-6 almond oil (e.g. LABRAFIL M 1966 CS), PEG-6 apricot kernel oil (e.g. LABRAFIL M 1944 CS), PEG-6 olive oil (e.g. LABRAFIL M 1980 CS), PEG-6 peanut oil (e.g. LABRAFIL M 1969 CS), PEG-6 hydrogenated palm kernel oil (e.g. LABRAFIL M 2130 BS), PEG-6 palm kernel oil (e.g. LABRAFIL M 2130 CS), PEG-6 triolein (e.g. LABRAFIL M 2735 CS), PEG-8 corn oil (e.g. LABRAFIL WL 2609 BS), PEG-20 corn glycerides (e.g. CROVOL M40), PEG-20 almond glycerides (e.g. CROVOL A40), lipophilic polyoxyethylene-polyoxypropylene block co-polymers (e.g. Pluronic L92, L101, L121 etc.), propylene glycol fatty acid esters, such as propylene glycol monolaurate (e.g. LAUROGLYCOL FCC), propylene glycol ricinoleate (e.g. PROPYMULS), propylene glycol monooleate (e.g. MYVEROL P-O6), propylene glycol dicaprylate/dicaprate (e.g. CAPTEX® 200), and propylene glycol dioctanoate (e.g. CAPTEX® 800), propylene glycol monocaprylate (e.g. CAPRYOL® 90); propylene glycol oleate (e.g. LUTROL 0P2000); propylene glycol myristate; propylene glycol mono stearate; propylene glycol hydroxy stearate; propylene glycol ricinoleate; propylene glycol isostearate; propylene glycol mono-oleate; propylene glycol dicaprylate/dicaprate; propylene glycol dioctanoate; propylene glycol caprylate-caprate; propylene glycol dilaurate; propylene glycol distearate; propylene glycol dicaprylate; propylene glycol dicaprate; mixtures of propylene glycol esters and glycerol esters such as mixtures composed of the oleic acid esters of propylene glycol and glycerol (e.g. ARLACEL® 186); sterol and sterol derivatives such as cholesterol, sitosterol, phytosterol, phytosterol fatty acid esters, PEG-5 soya sterol, PEG-10 soya sterol, PEG-20 soya sterol, and the like; glyceryl palmitostearate, glyceryl stearate, glyceryl distearate, glyceryl monostearate, or a combination thereof sorbitan fatty acid esters such as sorbitan monolaurate (e.g. ARLACEL 20), sorbitan monopalmitate (e.g. SPAN-40), sorbitan monooleate (e.g. SPAN-80), sorbitan monostearate, and sorbitan tristearate, sorbitan monolaurate, sorbitan monopalmitate, sorbitan monooleate, linoleoyl polyoxyl-6 glycerides, polyglyceryl 3-oleate, lauroyl PEG-32 glycerides, sorbitan trioleate, sorbitan sesquioleate, sorbitan tristearate, sorbitan monoisostearate, sorbitan sesquistearate, and the like; fatty acids such as capric acid, caprylic acid, oleic acid, linoleic acid, myristic acid, menthol, menthol derivatives, lecithin, phosphatidyl choline, bile salts, and the like, and mixtures thereof. In some cases, an additive for the compositions and oral dosage forms can be a lipophilic surfactant.

In one particular embodiment, the lipophilic additive can be a lipophilic surfactant. Non-limiting examples of lipophilic surfactants suitable for this invention include tributylcitrate, triethylcitrate, triacetin, ethyl cellulose, cellulose esters, cellulose acetate, cellulose acetates butyrate, benzyl benzoate, cellulose acetate phthalate, hydroxypropyl methylcellulose phthalate, tocopherol, tocopherol acetate, tocopherol succinate, corn oil, olive oil, peanut oil, safflower oil, sesame oil, soybean oil, hydrogenated castor oil, glyceryl tricaprate, glyceryl trilaurate, glyceryl trioleate, glyceryl trilinoleate, glyceryl tricaprylate/caprate, glyceryl tricaprylate/caprate/laurate, glyceryl tricaprylate/caprate/linoleate, glyceryl tricaprylate/caprate/stearate, saturated polyglycolized glycerides linoleic glycerides, caprylic/capric glycerides capric acid, caprylic acid, palmitic acid, ! auric acid, stearic acid, linoleic acid, oleic acid, arachidonic acid, eicosapentaenoic acid, docosahexaenoic acid, glyceryl monooleate, glyceryl monolinoleate, glyceryl monolaurate, glycerol monostearate, glyceryl distearate, glyceryl palmitostearate, glyceryl laurate, glyceryl caprylate, distearin, monopalmitolein, monolaurin, ethyl oleate, PEG-6 corn oil, PEG-6 apricot kernel oil, PEG-4 caprylic/capric triglyceride, PEG-20 sorbitan monostearate, PEG-4 laurate, PEG-6 dilaurate, polyglyceryl-3 oleate, polyglyceryl-6 dioleate, poloxamer 182, propylene glycol monocaprylate, propylene glycol monolaurate, propylene glycol dicaprylate/dicaprate, propylene glycol caprylate/caprate, sorbitan monolaurate, sorbitan monopalmitate, sorbitan monooleate, sorbitan monostearate, sorbitan sesquioleate, sorbitan sesquistearate, and combinations thereof.

In one embodiment, the pharmaceutical compositions or oral dosage forms of the present invention can be formulated to include a hydrophilic additive. In one aspect, the hydrophilic additive can comprise without limitation, non-ionic surfactants, ionic surfactants, zwitterionic surfactants, the like, or combinations thereof. Suitable hydrophilic surfactants can include: alcohol-oil transesterification products; polyoxyethylene hydrogenated vegetable oils; polyoxyethylene vegetable oils; alkyl sulphate salts, dioctyl sulfosuccinate salts; polyethylene glycol fatty acids esters; polyethylene glycol fatty acids mono- and di-ester mixtures; polysorbates, polyethylene glycol derivatives of tocopherol, the like, or combinations thereof. Two or more hydrophilic additives from the same or different classes can be referred to as the hydrophilic surfactant unless explicitly specified. In one aspect, non-limiting examples of hydrophilic surfactants can comprise PEG-8 caprylic/capric glycerides, lauroyl macrogol-32 glyceride, stearoyl macrogol glyceride, PEG-40 hydrogenated castor oil, PEG-35 castor oil, SLS, sodium dioctyl sulfosuccinate, polyethylene glycol fatty acids mono- and di-ester mixtures, polysorbate 80, polysorbate 20, polyethylene glycol 1000 tocopherol succinate, phytosterols, phytosterol fatty acid esters, poloxamer (e.g., poloxamer 407, poloxamer 188, poloxamer 108) and the like, or combinations thereof.

In another embodiment, the hydrophilic additive can be a hydrophilic surfactant. In one embodiment, when the hydrophilic additive includes hydrophilic surfactants, the hydrophilic surfactant does not appreciably solubilize the ester of 17-hydroxyprogesterone. Non-limiting examples of hydrophilic additives include salts of citric acid, maleic acid, tartaric acid, acetic acid, ascorbic acid, benzoic acid and lactic acid, potassium hydroxide, sodium hydroxide, sodium hydrogen carbonate, calcium carbonate, silicon dioxide, magnesium aluminum silicate, hydroxypropyl cyclodextrin, fatty acid glycerides, salts of bile acids, pyrrolidone, polyvinylpyrrolidone, ethyl alcohol, benzyl alcohol, glycerol, propylene glycol, polyethylene glycol methyl cellulose, hydroxypropyl methyl cellulose, cellulose esters, carbomer, chitosan, methacrylates, polyvinyl alcohol, gelatin, PEG-8 caprylic/capric glycerides, lauroyl macrogol-32 glyceride, stearoyl macrogol glyceride, PEG-40 hydrogenated castor oil, PEG-35 castor oil, sodium oleate, sodium lauryl sulfate, sodium lauryl sarcosinate, sodium dioctyl sulfosuccinate, PEG-10 laurate, PEG-20 oleate, PEG-30 stearate, PEG-40 laurate, PEG-20 glyceryl laurate, PEG-20 glyceryl tearate, PEG-40 glyceryl laurate, PEG-20 glyceryl oleate, PEG-10 sorbitan laurate, PEG-20 sorbitan monolaurate, PEG-20 sorbitan monooleate, polyglyceryl-10 oleate, polyglyceryl-10 mono, dioleate, poloxamer (e.g., poloxamer 407, poloxamer 188, poloxamer 108), maltose, sucrose, fructose, mannitol, xylitol, and combinations thereof.

Poloxamer represents Polyethylene-Polyoxypropylene Block Copolymer (AKA-"poloxamer") and can be any kinds of the following formula: These polymers have the formula: HO(C<2>H<4>O)<a>(C<3>H<6>O)<b>(C<2>H<4>O)<a>H, where "a" and "b" denote the number of polyoxyethylene and polyoxypropylene units, respectively. The compounds are listed by generic name, with the corresponding "a" and "b" values. POE-POP Block Copolymers)); (a, b values in)); (HO(C<2>H<4>O)<a>)); (COMPOUND (C<3>H<6>O)<b>(C<2>H<4>O)<a>H (HLB)); (Poloxamer 105 (a=11 (b=16 (8)); (Poloxamer 108 (a=46 (b=16 (>10)); (Poloxamer 122 (a=5 (b=21 (3)); (Poloxamer 123 (a=7 (b=21 (7)); (Poloxamer 124 (a=11 (b=21 (>7)); (Poloxamer 181 (a=3 (b=30)); (Poloxamer 182 (a=8 (b=30 (2)); (Poloxamer 183 (a=10 (b=30)); (Poloxamer 184 (a=13 (b=30)); (Poloxamer 185 (a=19 (b=30)); (Poloxamer 188 (a=75 (b=30 (29)); (Poloxamer 212 (a=8 (b=35)); (Poloxamer 215 (a=24 (b=35)); (Poloxamer 217 (a=52 (b=35)); 10 (Poloxamer 231 (a=16 (b=39)); (Poloxamer 234 (a=22 (b=39)); (Poloxamer 235 (a=27 (b=39)); (Poloxamer 237 (a=62 (b=39 (24)); (Poloxamer 238 (a=97 (b=39)); (Poloxamer 282 (a=10 (b=47)); (Poloxamer 284 (a=21 (b=47)); (Poloxamer 288 (a=122 (b=47 (>10)); (Poloxamer 331 (a=7 (b=54 (0.5)); (Poloxamer 333 (a=20 (b=54)); (Poloxamer 334 (a=31 (b=54)); (Poloxamer 335 (a=38 (b=54)); (Poloxamer 338 (a=128 (b=54)); (Poloxamer 401 (a=6 (b=67)); (Poloxamer 402 (a=13 (b=67)); (Poloxamer 403 (a=21 (b=67)); (Poloxamer 407 (a=98 (b=67)); and combinations thereof.

In another particular embodiment, the carrier can be a hydrophilic surfactant and can be ionic or non-ionic surfactant. Non-limiting examples of hydrophilic surfactants include proteins, gelatin, salts of bile acids, PEG-8 caprylic/capric glycerides, lauroyl macrogol-32 glyceride, stearoyl macrogol glyceride, PEG-40 hydrogenated castor oil, PEG-35 castor oil, sodium oleate, sodium lauryl sulfate, sodium lauryl sarcosinate, sodium dioctyl sulfosuccinate, PEG-10 laurate, PEG-20 oleate, PEG-30 stearate, PEG-40 laurate, PEG-20 glyceryl laurate, PEG-20 glyceryl tearate, PEG-40 glyceryl laurate, PEG-20 glyceryl oleate, PEG-10 sorbitan laurate, PEG-20 sorbitan monolaurate, PEG-20 sorbitan monooleate, polyglyceryl-10 oleate, polyglyceryl-10 mono, dioleate, poloxamer (e.g., poloxamer 407, poloxamer 188, poloxamer 108), and combinations thereof.

In one embodiment, the hydrophilic additive can be free of hydrophilic surfactants, and can be citric acid, maleic acid, tartaric acid, acetic acid, ascorbic acid, benzoic acid, lactic acid, potassium hydroxide, sodium hydroxide, sodium hydrogen carbonate, calcium carbonate, silicon dioxide, magnesium aluminum silicate, hydroxypropyl cyclodextrin, pyrrolidone, polyvinylpyrrolidone, ethyl alcohol, benzyl alcohol, glycerol, propylene glycol, polyethylene glycol, methyl cellulose, hydroxypropyl methyl cellulose, cellulose esters, carbomer, chitosan, methacrylates, polyvinyl alcohol, gelatin, maltose, sucrose, fructose, mannitol, xylitol, and combinations thereof.

In yet another aspect, additives can comprise sterols and derivatives of sterols. In various aspects, these additional agents can be hydrophilic or lipophilic. Examples of hydrophilic sterols include: lanosterol PEG-24 cholesterol ether (e.g. SOLULAN C-24, Amerchol), PEG-30 soya sterol (e.g. NIKKOL BPS-30, from Nikko), PEG-25 phytosterol (e.g. NIKKOL BPSH-25 from Nikko), PEG-30 cholestanol (e.g. NIKKOL DHC, from Nikko). Examples of Lipophilic Sterol Surfactants are Cholesterol, sitosterol, Phytosterol (e.g. GENEROL series from Henkel), PEG-5 soya sterol (e.g. NIKKOL BPS-S, from Nikko), PEG-10 soya sterol (e.g. NIKKOL BPS-10 from Nikko), PEG-20 soya sterol (e.g. NIKKOL BPS-20 from Nikko), the like, or combinations thereof.

In another aspect, the oral compositions can further comprise a polymeric release modifier. The polymeric release modifier can comprise: celluloses, such as hydroxypropyl celluloses low molecular weight, low viscosity types (e.g. METHOCEL E5, E6, E10 E15, LV100 etc. grades), hydroxypropyl celluloses having higher molecular weight, medium to high viscosity (e.g. METHOCEL K4M, K15M, K100M etc.), polyvinylpyrrolidones (e.g. KOLLIDON k17, K30 etc.), polyvinyl acetates, hydroxypropyl methylcellulose (HPMC), hydrophilic vinyl and acrylic polymers, polysaccharides such as calcium alginate, polyethylene oxide (PEO), polyethylene glycol (PEG), polypropylene glycol (PPG), poly(2-hydroxyethyl methacrylate), poly(acrylic) acid, poly(methacrylic) acid, polyvinylpyrrolidone (PVP) and crosslinked PVP polyvinyl alcohol (PVA), PVA/PVP copolymers and PVA/PVP copolymers with hydrophobic monomers such as methyl methacrylate, vinyl acetate, and the like, hydrophilic polyurethanes containing large PEO blocks, Sodium croscarmellose, carrageenan, hydroxyethyl cellulose (HEC), carboxymethyl cellulose (CMC) and carboxy ethyl cellulose (CEC), sodium alginate, polycarbophil, gelatin, Xanthan gum, and sodium starch glycolate, the like, or combinations thereof.

EXAMPLE 1

Exemplary Oral HPC Compositions

The following oral HCP composition examples are provided to promote a clearer understanding of certain embodiments of the present method of this invention and are in no way meant as a limitation thereon.

polymers, preservatives, antigellants, rheology control agents, softeners, solubilizers; solvents tonicifiers, viscosity modulators, UV absorbers, or combinations.

The oral compositions used with the current method can comprise a crystalline form of HPC and carriers. The form of the drug can be interchanged with other forms such as micronized, sieved, milled, amorphous, nanosized, etc. The oral HPC dosage forms can also be single or multiple particulate units in a capsule, or as single or multiple particulate units compressed as a monolithic/matrix tablet or multi-layer tablets.

TABLE 1B

Examples of oral compositions comprising a solid form of HPC in the dosage form

| Component | Composition 1B# (w/w %) | | | | | | | | | | |
|---|---|---|---|---|---|---|---|---|---|---|---|
| | a | b | c | d | e | f | g | h | i | j | k |
| HPC | 15-40 | 15-40 | 15-40 | 15-45 | 18-40 | 18-33 | 18-33 | 20-30 | 40-50 | 20-30 | 5-15 |
| Surfactants* | | 15-30 | 0-25 | 0-25 | 0-25 | 0-20 | 5-10 | 5-10 | 10-20 | 0-25 | 5-15 |
| Processing aids† | q.s. | q.s. | q.s. | q.s. | q.s. | q.s. | q.s. | q.s. | q.s. | q.s. | q.s. |

*Surfactants can comprise lipophilic (e.g. sorbitan monolaurate, propylene glycol laurate, sorbitan monooleate, etc.) and/or hydrophilic surfactants (e.g. sodium lauryl sulfate, poloxamer, polysorbate-80, sodium docusate etc.).
†Processing aids can comprise, but not limited to, fillers, binders, disintegrants, antioxidants, lubricants, plasticizers, solidifiers, flavoring agents, sweeteners, antimicrobial preservatives, antioxidants, edible fat, coating agents, colorants, solvents, co-solvents, polymers, a combination thereof, and so on.

TABLE 1A

Compositions comprising HPC

| Ingredients | Composition 1A# (% w/w) | | | | | |
|---|---|---|---|---|---|---|
| | a | b | c | d | e | f |
| HPC | 14-20 | 16-25 | 14-20 | 20-35 | 20-35 | 35-42 |
| Lipophilic additive(s) | 50-80 | 55-80 | 35-80 | 45-80 | 40-60 | 40-65 |
| Hydrophilic additive(s) | 0-30 | 0-20 | 5-45 | 0-20 | 0-40 | 0-25 |
| Other additives† | q.s. | q.s. | q.s. | q.s. | q.s. | q.s. |

†Other additives can be plasticizers, solidifiers, flavoring agents, sweeteners, antimicrobial preservatives, antioxidants, edible fat, coating agents, colorants, solvents, co-solvents, polymers, a combination thereof, and so on.

Additional tableting methods known in the art can be used for the oral HPC compositions with the current oral HPC methods (e.g., powder encapsulation, melt and extrusion, wetting granulation, dry granulation, direct compression, spray coating, and so on). The carrier for the oral HPC compositions with the current methods can include at least one of a lipophilic and/or a hydrophilic component additive. The lipophilic and hydrophilic additives that can be used in the compositions of the invented method can be selected from a variety of classes of the pharmaceutical aids including, but not limited to, absorbents, acids, adjuvants, anticaking agent, antitacking agents, antifoamers, anticoagulants, antimicrobials, antioxidants, antiphlogistics, astringents, antiseptics, bases, binders, bufferants, chelating agents, sequestrants, celluloses, coagulants, coating agents, colorants, dyes, pigments, complexing agents, crystal growth regulators, denaturants, desiccants, drying agents, dehydrating agents, diluents, disintegrants, dispersants, emollients, emulsifiers, encapsulants, enzymes, extenders, fillers, flavor masking agents, flavorants, fragrances, gelling agents, glidants hardeners, stiffening agents, humectants, lubricants, moisturizers, pH control agents, plasticizers, soothing agents, demulcents, retarding agents, spreading agents, stabilizers, suspending agents, sweeteners, thickening agents, consistency regulators, surfactants, opacifiers,

EXAMPLE 2

Comparative Pharmacokinetics of an Exemplary Composition post Oral Dosing Relative to Injectable Intramuscular HPC Composition of Prior Art To evaluate safety, tolerability and HPC levels following multiple dose oral HPC administration, a clinical study was conducted in pregnant women wherein three doses of an oral HPC composition, 1B#. i shown in Table 1B, 400 mg BID, 600 mg BID and 800 mg BID were administered, then followed by administration of once weekly dose of 250 mg injectable HPC (i.e., MAKENA).

The main objective of the study was to assess plasma HPC concentrations following administration of three doses of the currently invented oral HPC composition and method relative to the marketed injectable HPC (e.g. MAKENA) administration.

The study was an open-label, four-period, four-treatment, randomized, single and multiple doses, PK study in pregnant women of three dose levels of the oral HPC composition and IM injectable HPC (MAKENA). The study enrolled 12 healthy pregnant women with a gestational age of approximately 16 to 19 weeks. Subjects received three dose levels of the oral HPC composition (400 mg BID, 600 mg BID, and 800 mg BID) with food in a randomized, crossover manner during the first three treatment periods and then received five weekly injections of IM injectable HPC (MAKENA) during the fourth treatment period.

During each of the oral HPC treatment periods, subjects received a single dose of the oral composition on Day 1 followed by twice daily administration from Day 2 to Day 8. Following completion of the three-dose treatment periods and a washout period, all subjects received five weekly injections of HPC.

Blood samples were collected for pharmacokinetics during the study at the following times:
Oral Treatment
  Day 1: Blood sampling at 0 (pre-dose), 2, 4, 6, 8, 10, 12, 14, 24 hours post dose Day 7: Blood sampling at 0 hr (pre-dose) before first dose of 8$^{th}$ day
Day 8: Blood sampling at 0, 2, 4, 6, 8, 10, 12, 14, 16, 18, 20, 24, 28 and 36 hours post AM dose
Injectable Treatment (MAKENA)
   Week 5: Blood sampling at 0, 6, 12, 24, 36, 48, 72, 96, 120, 144, 168 hours post dose

TABLE 2

Mean PK parameters of HPC post administration of the oral HPC at Day 8 and injectable intramuscular (IM) HPC at Week 5 to healthy pregnant women

| | Oral HPC | | | Injectable IM HPC |
|---|---|---|---|---|
| PK Parameter* | 400 mg BID N = 12 | 600 mg BID N = 11 | 800 mg BID N = 12 | 250 mg weekly N = 11 |
| | PK at Day 8/Week 5 | | | |
| $C_{max}$ (ng/mL), mean (min, max) | 38.9 (14.8, 83.3) | 78.6 (35.7, 181) | 109.4 (56.2, 176) | 17.3 (9.8, 26.1) |
| $C_{avg}$ (ng/mL), mean (min, max) | 12.8 (6.7, 17.5) | 23.2 (12.7, 32.5) | 35.5 (17.1, 49.3) | 11.3 (6.8, 16.9) |
| $T_{max}$, hr (min, max) | 7.6 (2.0, 18.0) | 4.0 (2.0, 16.0) | 3.9 (2.0, 14.0) | 27.1 (12.0, 72.0) |
| Fluctuation ratio ($C_{max}/C_{min}$), mean (min, max) | 13.0 (6.4, 30.1) | 16.9 (7.9, 43.7) | 13.1 (7.5, 24.6) | 2.4 (1.6, 3.3) |

*$C_{max}$, $C_{avg}$, $T_{max}$, and Fluctuation ratio ($C_{max}/C_{min}$) values for oral HPC are mean values based on 24 hours (a day), while for injectable IM HPC are mean values based on 168 hours (a week) period.

As shown in Table 2, mean $C_{max}$ and $C_{avg}$ levels obtained from dosing regimen of the oral HPC composition are distinctly different from injectable IM HPC. Especially, the 800 mg BID oral HPC dosing regimen resulted in about three times higher in $C_{avg}$ compared to injectable IM HPC dose. In addition, mean $T_{max}$ to reach to $C_{max}$ levels was significantly different between the oral HPC dosing regimen (mean $T_{max}$ from about 4 hrs to about 8 hrs) and injectable IM HPC (about 27 hrs). The intraday fluctuation ratio ($C_{max}/C_{min}$) for oral HPC vs one dose per week for injectable IM HPC) were also unique for oral HPC compared to injectable IM HPC. Oral HPC administration resulted in the range of fluctuation ratio from about 6 to about 44, while injectable HPC administration ranged from 1.6 to 3.3.

Therefore, in another aspect, the intraday fluctuation characteristic as measured by fluctuation ratio (Cmax/Cmin) at day 8 (steady state) from the oral inventive HPC method and composition of treatment therapy is approximately ~7 times the injectable therapy (as shown in table 2) could be vital to confer favorable benefit to risk profile of the inventive oral method of treatment relative to inter week HPC fluctuating profile.

EXAMPLE 3

Treatment Intervention Method of Oral HPC Treatment

The time to reach the steady state or projected efficacious serum HPC concentrations post administration was estimated from simulations using single dose PK parameters obtained from the clinical study described in Example 2. The time to reach at steady state or projected effective of HPC concentrations post administration was estimated to be about two days to seven days for the inventive oral HPC composition and method of treatment relative to estimated 5 weeks needed with injectable HPC. Therefore, patients receiving oral HPC therapy disclosed herein would benefit from sooner achievement of projected efficacious levels, in days versus weeks typically observed with currently available injectable therapy.

It should also be noted that based on the results and associated simulations steady state/projected effective HPC concentrations in patients can be achieved for longer treatment duration with the inventive oral HPC method and composition treatment compared to patients with injectable therapy. For instance in the instant invention, if therapy starts at 16 weeks of fetus gestational age and ends at about 37 weeks (normal GA at delivery) of GA in both therapies, the steady state or projected effective levels are maintained for a longer duration relative to currently approved injectable method of treatment by about at least five to ten weeks. This extended treatment duration renders the treatment more effective in preventing PTB.

Furthermore, the oral HPC inventive disclosed method herein for treatment by providing early intervention with exogenous progestin such as HPC relative endogenous progesterone production during pregnancy is estimated to result in benefits for reduction of PTB recurrence rate and improvement (reduction in occurrence rate) of NCI as projected difference from a placebo group for the oral HPC method and composition is shown in table 3.

TABLE 3

Projected differences of recurrent rate of PTB <35 weeks and improvement in NCI score in the oral HPC treatment method compared to placebo according to GA in current pregnancy

| | Difference for HPC therapy outcomes relative to placebo Oral HPC (projected) | |
|---|---|---|
| GA in current pregnancy | Occurrence rate of PTB <35 weeks of GA | Improvement (reduction of occurrence rate) in NCI |
| 14_0 weeks to 15_6 weeks | <−16% | >10% |
| 16_0 weeks to 17_6 weeks | <−16% | >10% |
| 18_0 weeks to 20_6 weeks | <−3% | >2% |
| Overall | <−7% | >5% |

Therefore, in one embodiment, the current method of the invention includes early intervention with oral HPC in pregnant women with altered risk for PTB starting at 14 weeks of GA or less than 18 weeks in the current pregnancy with risk of recurrent PTB.

EXAMPLE 4

Projected Efficacy Performance of the Inventive Oral HPC Method of this Disclosure on Patients with Altered Risk Due to the Effect of Gestational Age in Previous PTB Also, it was surprisingly found that improvement of NCI and reduction of occurrence rate of PTB <35 weeks of GA are associated with earlier GA of previous PTB in pregnant women with PTB risk. Table 4 displays the projected performance of the oral HPC method of this invention with regard to NCI improvement and PTB occurrence rate outcomes in patients with an altered risk.

TABLE 4

Projected difference of the oral HPC method for occurrence rate of PTB <35 weeks of GA and improvement of NCI score compared to placebo estimated by GA of the immediately preceding PTB in patients with altered risk of recurrent PTB

| | Oral HPC (projected) Difference for HPC therapy vs placebo ||
|---|---|---|
| GA in previous PTB | Occurrence rate of PTB <35 weeks of GA | Improvement (reduction on occurrence rate) of NCI |
| 28 to <32 weeks | <−10% | >11% |
| 32 to <35 weeks | <−15% | >6% |
| 35 to <37 weeks | <−5% | >0% |
| Overall | <−7% | >5% |

As shown in Table 4, depending on the target altered risk patient population based on qualified previous PTB, the oral HPC therapy method can be expected to reduce the occurrence rate of PTB <35 weeks of GA by greater than about 5% and improvement (reduction of occurrence rate) of NCI compared to placebo treated pregnant subject group with similar altered risk based on qualified previous PTB.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of preventing or reducing the likelihood of recurrent PTB in a subject, said method comprising orally administering to said subject an oral dosage form having an effective amount of a pharmaceutical composition comprising HPC,
   wherein said subject comprises a pregnant subject, and
   wherein said administration results in a $C_{min}$ of HPC in said subject of about 4 ng/ml to about 16 ng/ml, and
   wherein said administration comprises a dosing regimen, said dosing regimen comprising at least one of a once-a-day administration, a twice-a-day administration, and a three-times-a-day administration, and wherein said dosing regimen comprises a total daily administration of HPC of about 1,200 mg to about 1600 mg, and
   wherein said method comprises at least one of:
   said dosing regimen begins at a GA of a fetus of said subject of at least one of no more than 14 weeks, no more than 15 weeks, no more than 16 weeks, no more than 17 weeks, and less than 18 weeks, and occurs for a duration of no less than at least one of 19 weeks, 20 weeks, 21 weeks, 22 weeks, 23 weeks, 24 weeks, 25 weeks, and two weeks post-delivery, and
   said subject has had a qualified PTB of less than at least one of 35 weeks, 34 weeks, 33 weeks, and 32 weeks, and
   wherein in comparison to the administration of a placebo, said administration of said HPC results in a minimum improvement of a total NCI outcome of a neonate of said subject of at least one of 10%, 15%, 20%, 25%, 30%, 35%, 40%, 45%, and 50%.

2. The method of claim 1 wherein in comparison to the administration of a placebo, said administration of said HPC results in a plurality of:
   a reduced likelihood of death of a neonate of said subject prior to hospital discharge thereof,
   an improvement in a grade III or IV intraventricular hemorrhage of a neonate of said subject,
   an improvement in respiratory distress syndrome of a neonate of said subject,
   an improvement of bronchopulmonary dysplasia of a neonate of said subject,
   an improvement of necrotizing enterocolitis of a neonate of said subject,
   an improvement of proven sepsis of a neonate of said subject,
   a reduction in a length of stay (LOS) of a neonate of said subject in a medical care facility of at least three days, and
   a minimum responder rate of at least one of 5%, 7%, 9%, 10%, 12%, 13%, 15%, 20%, 25%, 30%, 35%, 40%, 45%, and 50% for said subject giving birth at no earlier than at least one of 32 weeks, 35 weeks, and 37 weeks, when said HPC is administered to a group of subjects.

3. The method of claim 1 wherein said administration results in an at least one of:
   a $C_{max}$ in said subject in the range of about 35 ng/ml to about 180 ng/ml,
   a $C_{avg}$ in said subject in the range of about 6 ng/ml to about 50 ng/ml,
   an effective level of HPC in said subject in about one day to about one week,
   a $T_{max}$ in the range of about 2 hours to about 12 hours post administration,
   a $C_{avg}$ post administration efficacy minimum threshold level (EMTL) of plasma HPC concentration in said subject in less than at least one of 7 days, 6 days, 5 days, 4 days, 3 days, and 2 days, and
   a daily minimum fluctuation ratio of at least one of 6, 8, 10, 13, 15, 18, 20, 25, 30, 35, 40, and 44.

4. The method of claim 1 wherein said subject is at altered risk of PTB, and wherein said oral dosage form comprises a solid oral dosage form.

5. The method of claim 4 wherein said altered risk comprises said subject having at least one indicator of altered risk of PTB comprising:
   said subject has at least one PTB altered risk associated biomarker (PARABM),
   said subject has had a qualified PTB of less than at least one of 35 weeks, 34 weeks, 33 weeks, and 32 weeks,
   said subject has cervix insufficiency,
   said subject had a previous cerclage,
   said subject is in need of cerclage,
   said subject has abused a substance during pregnancy,
   said subject is unmarried and partnerless,
   said subject has an educational level of no more than 12 years,
   said subject is of a predetermined age,
   said subject is of a predetermined race,
   a fetus of said subject is male,
   at least one of a previous fetus of said subject and a current fetus of said subject comprises a singleton fetus, and
   another MRF.

6. The method of claim 5 wherein said qualified PTB comprises a PTB of at least one of less than 35 weeks GA and less than 32 weeks GA.

7. The method of claim 5 wherein said method includes the step of identifying in the DNA of said subject at least one PARABM comprising at least one minor allele of a biomarker of table 1 of U.S. Pat. No. 9,840,738 having an OR of greater than 1.0.

8. The method of claim 7 wherein said method includes the step of detecting whether the biomarkers of IBP4 and SHBG are present in a biological sample of said subject comprising subjecting said sample to a proteomics workflow comprised of mass spectrometry quantification.

9. A method of preventing or reducing the likelihood of recurrent PTB in a subject, said method comprising orally administering to said subject an oral dosage form having an effective amount of a pharmaceutical composition comprising HPC, and
wherein said administration results in a $C_{min}$ of HPC in said subject of about 4 ng/ml to about 16 ng/ml, and
wherein said administration comprises a dosing regimen comprising at least one of a once-a-day administration, a twice-a-day administration, and a three-times-a-day administration, and
wherein said dosing regimen comprises a total daily administration of HPC of about 1,200 mg to about 1600 mg, and
wherein said method comprises at least one of:
said dosing regimen begins at a GA of a fetus of said subject of at least one of no more than 14 weeks, no more than 15 weeks, no more than 16 weeks, no more than 17 weeks, and less than 18 weeks. and
said subject has had a qualified PTB of less than at least one of 35 weeks, 34 weeks, 33 weeks, and 32 weeks, and
wherein in comparison to the administration of a placebo, said administration of said HPC results in a minimum improvement of a total NCI outcome of a neonate of said subject of at least one of 10%, 15%, 20%, 25%, 30%, 35%, 40%, 45%, and 50%, and a plurality of:
a reduced likelihood of death of a neonate of said subject prior to hospital discharge thereof,
an improvement in a grade III or IV intraventricular hemorrhage of a neonate of said subject,
an improvement in respiratory distress syndrome of a neonate of said subject,
an improvement of bronchopulmonary dysplasia of a neonate of said subject,
an improvement of necrotizing enterocolitis of a neonate of said subject,
an improvement of proven sepsis of a neonate of said subject,
a reduction in a length of stay (LOS) of a neonate of said subject in a medical care facility of at least three days, and
a minimum responder rate of at least one of 5%, 7%, 9%, 10%, 12%, 13%, 15%, 20%, 25%, 30%, 35%, 40%, 45%, and 50% for said subject giving birth at no earlier than at least one of 32 weeks, 35 weeks, and 37 weeks, when said HPC is administered to a group of subjects.

10. The method of claim 9 wherein said subject comprises a pregnant subject, and wherein said;
dosing regimen begins at a GA of a fetus of said subject of no more than at least one of 14 weeks, 15 weeks, and 16 weeks, and
occurs for a duration of no less than at least one of 19 weeks, 20 weeks, 21 weeks, 22 weeks, 23 weeks, 24 weeks, 25 weeks, and two weeks post-delivery.

11. The method of claim 9 wherein said administration results in an at least one of:
a $C_{max}$ in said subject in the range of about 35 ng/ml to about 180 ng/ml,
a $C_{avg}$ in said subject in the range of about 6 ng/ml to about 50 ng/ml,
an effective level of HPC in said subject in about one day to about one week,
a $T_{max}$ in the range of about 2 hours to about 12 hours post administration,
a $C_{avg}$ post administration efficacy minimum threshold level (EMTL) of plasma HPC concentration in said subject in less than at least one of 7 days, 6 days, 5 days, 4 days, 3 days, and 2 days, and
a daily minimum fluctuation ratio of at least one of 6, 8, 10, 13, 15, 18, 20, 25, 30, 35, 40, and 44.

12. The method of claim 9 wherein said subject is at altered risk of PTB, and wherein said oral dosage form comprises a solid oral dosage form.

13. The method of claim 12 wherein said altered risk comprises said subject having at least one indicator of altered risk of PTB comprising:
said subject has at least one PTB altered risk associated biomarker (PARABM),
said subject has had a qualified PTB of less than at least one of 35 weeks, 34 weeks, 33 weeks, and 32 weeks,
said subject has cervix insufficiency,
said subject had a previous cerclage,
said subject is in need of cerclage,
said subject has abused a substance during pregnancy,
said subject is unmarried and partnerless,
said subject has an educational level of no more than 12 years,
said subject is of a predetermined age,
said subject is of a predetermined race,
a fetus of said subject is male,
at least one of a previous fetus of said subject and a current fetus of said subject comprises a singleton fetus, and
another MRF.

14. The method of claim 13 wherein said qualified PTB comprises a PTB of at least one of less than 35 weeks GA and less than 32 weeks GA.

15. The method of claim 14 wherein said qualified PTB comprises an immediately preceding PTB.

16. The method of claim 13 wherein said method includes the step of identifying in the DNA of said subject at least one PARABM comprising at least one minor allele of a biomarker of table 1 of U.S. Pat. No. 9,840,738 having an OR of greater than 1.0.

17. The method of claim 16 wherein said method includes the step of detecting whether the biomarkers of IBP4 and SHBG are present in a biological sample of said subject comprising subjecting said sample to a proteomics workflow comprised of mass spectrometry quantification.

18. A method of preventing or reducing the likelihood of recurrent PTB in a subject, said method comprising orally administering to said subject an oral dosage form having an effective amount of a pharmaceutical composition comprising HPC, and
wherein said administration results in a Cmin of HPC in said subject of about 4 ng/ml to about 16 ng/ml, and
wherein said administration comprises a dosing regimen comprising at least one of a once-a-day administration, a twice-a-day administration, and a three-times-a-day administration, and
wherein said dosing regimen comprises a total daily administration of HPC of about 1,200 mg to about 1600 mg, and wherein said method comprises at least one of:
said dosing regimen begins at a GA of a fetus of said subject of at least one of no more than 14 weeks, no more than 15 weeks, no more than 16 weeks, no more than 17 weeks, and less than 18 weeks, and
said subject has had a qualified PTB of less than at least one of 35 weeks, 34 weeks, 33 weeks, and 32 weeks, and
wherein in comparison to the administration of a placebo, said administration of said HPC results in a minimum improvement of a total NCI outcome of a neonate of said subject of at least one of 10%, 15%, 20%, 25%, 30%, 35%, 40%, 45%, and 50%, and
wherein said administration results in an at least one of:
a $C_{max}$ in said subject in the range of about 35 ng/ml to about 180 ng/ml,
a $C_{avg}$ in said subject in the range of about 6 ng/ml to about 50 ng/ml,
an effective level of HPC in said subject in about one day to about one week,
a $T_{max}$ in the range of about 2 hours to about 12 hours post administration,
a $C_{avg}$ post administration efficacy minimum threshold level (EMTL) of plasma HPC concentration in said subject in less than at least one of 7 days, 6 days, 5 days, 4 days, 3 days, and 2 days, and
a daily minimum fluctuation ratio of at least one of 6, 8, 10, 13, 15, 18, 20, 25, 30, 35, 40, and 44.

19. The method of claim 18 wherein said subject comprises a pregnant subject, and wherein said
dosing regimen begins at a GA of a fetus of said subject of no more than at least one of 14 weeks, 15 weeks, and 16 weeks, and
occurs for a duration of no less than at least one of 19 weeks, 20 weeks, 21 weeks, 22 weeks, 23 weeks, 24 weeks, 25 weeks, and two weeks post-delivery.

20. The method of claim 18 wherein in comparison to the administration of a placebo, said administration of said HPC results in a plurality of:
a reduced likelihood of death of a neonate of said subject prior to hospital discharge thereof,
an improvement in a grade III or IV intraventricular hemorrhage of a neonate of said subject,
an improvement in respiratory distress syndrome of a neonate of said subject,
an improvement of bronchopulmonary dysplasia of a neonate of said subject,
an improvement of necrotizing enterocolitis of a neonate of said subject,
an improvement of proven sepsis of a neonate of said subject,
a reduction in a length of stay (LOS) of a neonate of said subject in a medical care facility of at least three days, and
a minimum responder rate of at least one of 5%, 7%, 9%, 10%, 12%, 13%, 15%, 20%, 25%, 30%, 35%, 40%, 45%, and 50% for said subject giving birth at no earlier than at least one of 32 weeks, 35 weeks, and 37 weeks, when said HPC is administered to a group of subjects.

21. The method of claim 18 wherein said subject is at altered risk of PTB, and wherein said oral dosage form comprises a solid oral dosage form.

22. The method of claim 21 wherein said altered risk comprises said subject having at least one indicator of altered risk of PTB comprising:
said subject has at least one PTB altered risk associated biomarker (PARABM),
said subject has had a qualified PTB of less than at least one of 35 weeks, 34 weeks, 33 weeks, and 32 weeks,
said subject has cervix insufficiency,
said subject had a previous cerclage,
said subject is in need of cerclage,
said subject has abused a substance during pregnancy,
said subject is unmarried and partnerless,
said subject has an educational level of no more than 12 years,
said subject is of a predetermined age,
said subject is of a predetermined race,
a fetus of said subject is male,
at least one of a previous fetus of said subject and a current fetus of said subject comprises a singleton fetus, and
another MRF.

23. The method of claim 22 wherein said qualified PTB comprises a PTB of at least one of less than 35 weeks GA and less than 32 weeks GA.

24. The method of claim 23 wherein said qualified PTB comprises an immediately preceding PTB.

25. The method of claim 22 wherein said method includes the step of identifying in the DNA of said subject at least one PARABM comprising at least one minor allele of a biomarker of table 1 of U.S. Pat. No. 9,840,738 having an OR of greater than 1.0.

26. The method of claim 25 wherein said method includes the step of detecting whether the biomarkers of IBP4 and SHBG are present in a biological sample of said subject comprising subjecting said sample to a proteomics workflow comprised of mass spectrometry quantification.

27. A method of preventing or reducing the likelihood of recurrent PTB in a subject, said method comprising orally administering to a subject an oral dosage form having an effective amount of a pharmaceutical composition comprising HPC, and
wherein said administration results in a Cmin of HPC in said subject of about 4 ng/ml to about 16 ng/ml, and
wherein said administration comprises a dosing regimen comprising at least one of a once-a-day administration, a twice-a-day administration, and a three-times-a-day administration, and
wherein said dosing regimen comprises a total daily administration of HPC of about 1,200 mg to about 1600 mg, and
wherein said method comprises at least one of:
wherein said dosing regimen begins at a GA of a fetus of said subject of at least one of no more than 14 weeks, no more than 15 weeks, no more than 16 weeks, no more than 17 weeks, and less than 18 weeks, and
said subject has had a qualified PTB of less than at least one of 35 weeks, 34 weeks, 33 weeks, and 32 weeks, and
wherein in comparison to the administration of a placebo, said administration of said HPC results in a minimum improvement of a total NCI outcome of a neonate of said subject of at least one of 10%, 15%, 20%, 25%, 30%, 35%, 40%, 45%, and 50%, and
wherein said subject is at altered risk of PTB.

28. The method of claim 27 wherein said altered risk comprises said subject having at least one indicator of altered risk of PTB comprising:
said subject has at least one PTB altered risk associated biomarker (PARABM),
said subject has had a qualified PTB of less than at least one of 35 weeks, 34 weeks, 33 weeks, and 32 weeks,
said subject has cervix insufficiency, said subject had a previous cerclage,
said subject is in need of cerclage,
said subject has abused a substance during pregnancy,
said subject is unmarried and partnerless,
said subject has an educational level of no more than 12 years,
said subject is of a predetermined age,
said subject is of a predetermined race,
a fetus of said subject is male,
at least one of a previous fetus of said subject and a current fetus of said subject comprises a singleton fetus, and
another MRF.

29. The method of claim 28 wherein said qualified PTB comprises a PTB of at least one of less than 35 weeks GA and less than 32 weeks GA.

30. The method of claim 29 wherein said qualified PTB comprises an immediately preceding PTB, and wherein said oral dosage form comprises a solid oral dosage form.

31. The method of claim 28 wherein said method includes the step of identifying in the DNA of said subject at least one PARABM comprising at least one minor allele of a biomarker of table 1 of U.S. Pat. No. 9,840,738 having an OR of greater than 1.0.

32. The method of claim 31 wherein said method includes the step of detecting whether the biomarkers of IBP4 and SHBG are present in a biological sample of said subject comprising subjecting said sample to a proteomics workflow comprised of mass spectrometry quantification.

33. The method of claim 32 wherein said subject comprises a pregnant subject, and wherein said
dosing regimen begins at a GA of a fetus of said subject of no more than at least one of 14 weeks, 15 weeks, and 16 weeks, and
occurs for a duration of no less than at least one of 19 weeks, 20 weeks, 21 weeks, 22 weeks, 23 weeks, 24 weeks, 25 weeks, and two weeks post-delivery.

34. The method of claim 27 wherein in comparison to the administration of a placebo, said administration of said HPC results in a plurality of:
a reduced likelihood of death of a neonate of said subject prior to hospital discharge thereof,
an improvement in a grade III or IV intraventricular hemorrhage of a neonate of said subject,
an improvement in respiratory distress syndrome of a neonate of said subject,
an improvement of bronchopulmonary dysplasia of a neonate of said subject,
an improvement of necrotizing enterocolitis of a neonate of said subject,
an improvement of proven sepsis of a neonate of said subject,
a reduction in a length of stay (LOS) of a neonate of said subject in a medical care facility of at least three days, and
a minimum responder rate of at least one of 5%, 7%, 9%, 10%, 12%, 13%, 15%, 20%, 25%, 30%, 35%, 40%, 45%, and 50% for said subject giving birth at no earlier than at least one of 32 weeks, 35 weeks, and 37 weeks, when said HPC is administered to a group of subjects.

35. The method of claim 27 wherein said administration results in an at least one of:
a $C_{max}$ in said subject in the range of about 35 ng/ml to about 180 ng/ml,
a $C_{avg}$ in said subject in the range of about 6 ng/ml to about 50 ng/ml,
an effective level of HPC in said subject in about one day to about one week,
a $T_{max}$ in the range of about 2 hours to about 12 hours post administration,
a $C_{avg}$ post administration efficacy minimum threshold level (EMTL) of plasma HPC concentration in said subject in less than at least one of 7 days, 6 days, 5 days, 4 days, 3 days, and 2 days, and
a daily minimum fluctuation ratio of at least one of 6, 8, 10, 13, 15, 18, 20, 25, 30, 35, 40, and 44.

36. The method of claim 6 wherein said qualified PTB comprises an immediately preceding PTB.

* * * * *